Dec. 29, 1959   TETSURO IZUMITANI ET AL   2,919,201
OPTICAL GLASS
Filed July 22, 1958

T. IZUMITANI
R. TERAI
H. HAMAMURA   INVENTORS

BY
Wenderoth, Lind & Ponack
Attys

United States Patent Office 2,919,201
Patented Dec. 29, 1959

2,919,201
OPTICAL GLASS

Tetsuro Izumitani, Ryohei Terai, and Hiroshi Hamamura, Ikeda City, Japan; said Hiroshi Hamamura now by change of name to Hiroshi Ogawa, assignors to Director of the Agency of Industrial Science and Technology, the Ministry of International Trade and Industry, Japanese Government Application July 22, 1958, Serial No. 750,554

1 Claim. (Cl. 106—47)

This application is a continuation-in-part of our application Serial No. 651,194, filed April 8, 1957, and now abandoned.

The present invention relates to the composition of an entirely new type of glasses, and has for its object to produce glasses of relatively low refractive index and high dispersion for optical purposes, which have never been materialized in the optical glass industry.

Figure 1:
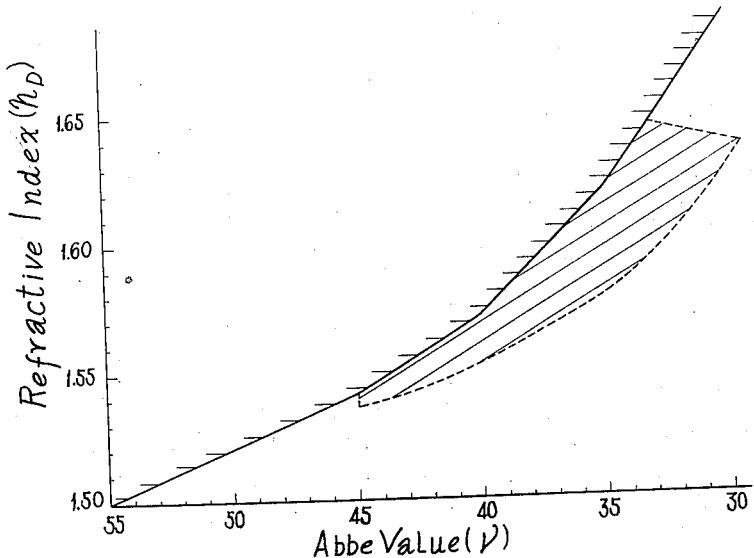

As will clearly be seen from the accompanying drawings, the refractive indices in $n_D$ and dispersion in $\gamma$-value of the products of the present invention, which are represented by the hatched area surrounded with a broken line in Figure 1, are respectively much lower and higher than those of the usual optical glasses like Jena, represented by the area above the solid line given in contrast in the same figure. In other words, the most important feature of the present invention is in extending those optical constants beyond the existing limits therefor by further lowering refractive index and raising dispersion than ever materialized. The optical glasses of the present invention are furthermore characterized by relatively better durability and high degree of hardness. These specific features and properties of the present invention are believed to have introduced an entirely new type of glasses in the optical glass industry, thereby making it possible to design lenses of lesser aberration and a higher degree of lightness than ever contrived.

Figure 2:
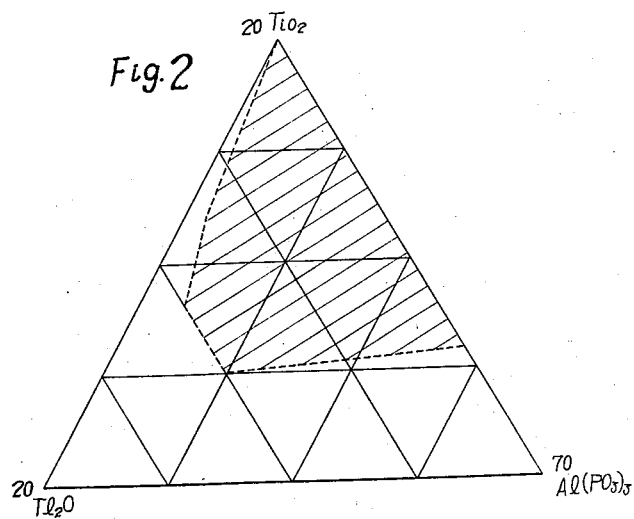

The composition of the present invention is 25 to 40 weight percent of sodium fluoride, 50 to 64 weight percent of aluminum metaphosphate, 5 to 20 weight percent of titanium oxide and 5 to 10 weight percent of thallium monoxide. In Figure 2 are represented by the hatched area surrounded with a broken line the glass compositions of aluminum metaphosphate, titanium oxide and thallium monoxide when content of sodium fluoride is restricted to 30 weight percent.

Of these components, aluminum metaphosphate is employed as a glass former as usual, but the most important factor is thallium monoxide used as a modifier to lower refractive index and to raise dispersion, as well as to prevent devitrification. Sodium fluoride is also employed as a modifier to lower refractive index, and titanium oxide to raise dispersion and to improve durability.

Generally speaking, the dispersion of glass is mainly due to the absorption in the ultraviolet range, and the degree of dispersion increases according as the wave length of the peak of the absorption becomes longer. Assuming that thallium monovalent ion has a tendency to raise the dispersion and to lower the refractive index, as the peak of the absorption by thallium monovalent ion is so high as 223, we used originally thallium monoxide as an indispensable glass component and obtained the glass of high dispersion and low refractive index.

G. Weissenberg used 4.3 weight percent of thallium monoxide as a component of glass, but he did not reveal that it has the above-mentioned tendency as shown in U.S.P. 2,763,559, column 2, lines 3 to 6.

As to the composition of the present invention, sodium fluoride is to be confined to 25 to 40 weight percent, because the lower proportion tends to cause devitrification and the higher to impair durability, the most desirable proportion thereof being 30 weight percent; aluminum metaphosphate is to be restricted to 50 to 64 weight percent, as the lower proportion is also inclined to cause devitrification and the higher to cause refractive index and dispersion to return to the level of Jena glasses, represented by the area above the solid line in Figure 1; titanium oxide is to be limited to 5 to 20 weight percent, for the higher proportion also tends to cause devitrification and the lower to induce refractive index and dispersion to retrograde to the level of Jena glasses; and thallium monoxide is to be confined to 5 to 10 weight percent, because the higher proportion likewise affect refractive index and dispersion, and the glasses obtained without this component are inclined to suffer devitrification. The addition of thallium monoxide, constituting the most specific feature of the present invention, is particularly conducive to lowering refractive index and raising dispersion, to preventing devitrification and to stabilizing the glasses.

In the present invention are employed as materials sodium fluoride, aluminum metaphosphate, titanium oxide and thallium nitrate. The glass is made by usual processes. Materials are thoroughly mixed according to the composition as stated before, and the batch is melted in a platinum crucible at about 1,000 to 1,200° C., which crucible is well covered to prevent the volatilization of the fluoride. In general, for a 50-gram melt, a liquid fluid results after about 15 minutes. The liquid is then stirred and poured into a stainless steel mold previously heated to 300 to 400° C., and slowly cooled. Annealing temperature is 380 to 430° C. An optical glass thus obtained is almost colorless or slightly yellowish, having better durability and a high degree of hardness.

Examples of the present invention are as follows:

| Example | Composition in Weight Percent | | | | Refractive Index in $n_D$ | Abbe Coefficient in $\nu$-value |
|---|---|---|---|---|---|---|
| | Al(PO$_3$)$_3$ | Tl$_2$O | TiO$_2$ | NaF | | |
| 1 | 52 | 5 | 13 | 30 | 1.5876 | 33.9 |
| 2 | 52 | 8 | 10 | 30 | 1.5717 | 36.3 |
| 3 | 52 | 10 | 8 | 30 | 1.5613 | 38.5 |
| 4 | 57 | 5 | 8 | 30 | 1.5547 | 40.2 |
| 5 | 58 | 5 | 7 | 30 | 1.5457 | 41.8 |
| 6 | 55 | 10 | 5 | 30 | 1.5392 | 44.5 |

In the above-mentioned examples, for obtaining a 50 x 50 x 5 mm. glass unit, annealing temperature and other factors are as follows:

| Example | Annealing temp. (°C.) | Soaking time (hrs.) | Cooling rate (°C./hr.) | Lower limit for slow cooling (°C.) |
|---|---|---|---|---|
| 1 | 428 | 2 | 2 | 348 |
| 2 | 404 | 2 | 2 | 324 |
| 3 | 385 | 2 | 2 | 305 |
| 4 | 409 | 2 | 2 | 329 |
| 5 | 404 | 2 | 2 | 324 |
| 6 | 380 | 2 | 2 | 300 |

What we claim is:

An optical glass composition consisting of 25 to 40 weight percent of sodium fluoride, 50 to 64 weight percent of aluminum metaphosphate, 5 to 20 weight percent of titanium oxide and 5 to 10 weight percent of thallium monoxide.

References Cited in the file of this patent

UNITED STATES PATENTS

| | | |
|---|---|---|
| 1,607,817 | Dennis | Nov. 23, 1926 |
| 2,430,539 | Sun | Nov. 11, 1947 |
| 2,472,448 | Sun | June 7, 1949 |
| 2,763,559 | Weissenberg | Sept. 18, 1956 |